United States Patent
Depardon et al.

(10) Patent No.: US 10,399,614 B2
(45) Date of Patent: Sep. 3, 2019

(54) MOTOR VEHICLE TAIL GATE PANEL AND MOTOR VEHICLE HAVING THE PANEL

(71) Applicant: Compagnie Plastic Omnium, Lyons (FR)

(72) Inventors: Pascal Depardon, Meximieux (FR); Bertrand Hache, Saint Cyr (FR)

(73) Assignee: Compagnie Plastic Omnium, Lyons (FR)

( * ) Notice: Subject to any disclaimer, the term of this patent is extended or adjusted under 35 U.S.C. 154(b) by 112 days.

(21) Appl. No.: 15/540,374

(22) PCT Filed: Dec. 9, 2015

(86) PCT No.: PCT/IB2015/059475
§ 371 (c)(1),
(2) Date: Jun. 28, 2017

(87) PCT Pub. No.: WO2016/108109
PCT Pub. Date: Jul. 7, 2016

(65) Prior Publication Data
US 2018/0265141 A1    Sep. 20, 2018

(30) Foreign Application Priority Data
Dec. 30, 2014    (CN) ............... 2014 2 0859708 U

(51) Int. Cl.
*B62D 35/00* (2006.01)
*B60J 5/10* (2006.01)
*B60R 13/04* (2006.01)

(52) U.S. Cl.
CPC ............ *B62D 35/007* (2013.01); *B60J 5/101* (2013.01); *B60J 5/107* (2013.01); *B60R 13/04* (2013.01); *Y02T 10/82* (2013.01)

(58) Field of Classification Search
CPC ......... B62D 35/007; B60J 5/101; B60J 5/107; B60R 13/04; Y02T 10/82
See application file for complete search history.

(56) References Cited

U.S. PATENT DOCUMENTS 6,521,326 B1 * 2/2003 Fischer ................... B32B 27/04
156/272.2
9,598,530 B2 * 3/2017 Gros .................... B21D 39/021
(Continued)

FOREIGN PATENT DOCUMENTS

FR      2990654 A1 * 11/2013 ............... B60J 1/02
JP      2001328429 A    11/2001
(Continued)

OTHER PUBLICATIONS

International Search Report PCT/ISA/210 for International Application No. PCT/IB2015/059475 dated Apr. 29, 2016.
(Continued)

*Primary Examiner* — Lori L Lyjak
(74) *Attorney, Agent, or Firm* — Harness, Dickey & Pierce, P.L.C.

(57) ABSTRACT

A motor vehicle tail gate panel has one side facing the inside of the motor vehicle and one side facing the outside of the motor vehicle and including a box having an adhesion area on the side facing the outside of the motor vehicle for adhering a glass to the surface of the box. The box extends beyond the adhesion area on the side opposite this area so as to form at least one section that is visible from the outside of the motor vehicle, and the section has a shape that enhances the aerodynamics of the motor vehicle. As a result, additional spoilers may not be needed, which improves productivity and reduces production costs. Example embodiments also relate to a motor vehicle that includes the tail gate panel.

7 Claims, 4 Drawing Sheets

(56) References Cited

U.S. PATENT DOCUMENTS

2008/0201929 A1* 8/2008 Baumgarten ........ B21D 39/021
   29/428
2013/0280452 A1* 10/2013 Nawroth .................. B60J 5/107
   428/35.7
2015/0291232 A1* 10/2015 Watanabe ................ B60J 5/101
   296/180.1

FOREIGN PATENT DOCUMENTS

JP          2011031686 A     2/2011
JP          2012144176 A     8/2012

OTHER PUBLICATIONS

Written Opinion of the International Searching Authority PCT/ISA/237 for International Application No. PCT/IB2015/059475 dated Apr. 29, 2016.

* cited by examiner

-- PRIOR ART --

MOTOR VEHICLE TAIL GATE PANEL AND MOTOR VEHICLE HAVING THE PANEL

CROSS-REFERENCE TO RELATED APPLICATIONS

This application is the U.S. National Phase application of PCT Application No. PCT/IB2015/059475 filed on Dec. 9, 2015, which claims priority to Chinese Application No. 201420859708.8 filed on Dec. 30, 2014, the contents of each of which are incorporated herein by reference in their entirety.

TECHNICAL FIELD

This invention pertains to the field of manufacturing motor vehicle bodywork elements; more specifically, it relates to a type of motor vehicle tail gate panel and motor vehicles having this panel.

PRIOR ART

In the field of manufacturing motor vehicle bodywork elements, an increasing number of elements are manufactured using composite materials, to reduce the total weight and fuel consumption. In addition, since the elements manufactured with composite materials have complex and variable shapes, and excellent mechanical performance, they are used in numerous motor vehicle elements, for example the structural elements of impact beams and doors. The term structural elements refers to the elements providing the necessary rigidity and strength to the bodywork or body of a vehicle; they are also used to support or carry other elements, for example, the motor vehicle tail gate panel.

The motor vehicle tail gate panel generally comprises a box; the box usually comprises an adhesion area for adhering a glass. In the current state of the art, as shown on FIG. 2, the box 2 is generally limited by an adhesion area 3, it does not go past the adhesion area to extend to a portion outside the tail gate. Moreover, to enhance the aerodynamics of the motor vehicle, and to comply with the requirements of emission standards, a spoiler 5 is attached or adhered to the portion which extends from the box 2 of the tail gate or on the glass 4. Since the attached or adhered spoiler is an additional element manufactured separately, this increases the cost and requires an additional manufacturing step; furthermore, the spoiler manufactured must be attached or adhered to the glass or to the box, which involves an additional technical operation; prior treatment must also be applied to the glass or to the box, for example drilling holes for screwing or riveting, or polishing to improve the adhesion efficiency, etc. These operations increase the costs of manufacturing the motor vehicle tail gate panel, extends the duration and adds technical steps. To simplify the manufacturing process described above, one possible replacement solution, when the tail gate glass is made of organic glass, consists in integrating the glass and the spoiler, the glass and the spoiler thus forming a unique element, which avoids the additional operations. One of the faults with this solution is that, since the formation and surface treatment of this glass are extremely difficult, the level of complexity of the spoiler integrated to the glass will be substantially limited, and due to these limits, it will be difficult to give the spoiler integrated to the glass a shape which will provide good aerodynamics, which will cancel or limit the role of the spoiler in this area.

It therefore seems necessary to propose a replacement solution in order to obtain a motor vehicle tail gate panel performing the functions of an efficient spoiler and which can be manufactured and integrated economically, and which can further guarantee that the portion performing the function of spoiler provides good aerodynamics.

DESCRIPTION OF THE INVENTION

The purpose of this invention is to remedy the faults of the above solutions so as to manufacture a motor vehicle tail gate panel comprising spoilers, by proposing an efficient and economically feasible replacement solution. This invention therefore proposes a motor vehicle tail gate panel having one side facing the inside of the vehicle and one side facing the outside of the vehicle, and having a box which comprises an adhesion area on the outer side for adhering a glass, characterised in that the box extends beyond the adhesion area, so as to form at least one section that is visible from the outside of the vehicle, whose shape provides good aerodynamics. Since this portion provides good aerodynamics, it can perform the same role as an attached or adhered spoiler. Moreover, since this portion is integrated to the box of the motor vehicle tail gate, there is no need to manufacture an additional spoiler separately and, in addition, there is no technical installation operation, which significantly improves productivity and reduces the production cost. Moreover, since the boxes of the motor vehicle tail gate are generally manufactured from composite materials, all sorts of complex profiled shapes can be obtained, thereby meeting the requirements of good aerodynamics and thus optimising the aerodynamics of the motor vehicle. Lastly, since the entire panel is integrated, there is no need for the metal inserts or connection elements located between the former elements, which therefore substantially reduces the weight and air resistance of the motor vehicle on this portion.

One embodiment according to this invention consists in a tail gate panel comprising two sections visible from the outside to form spoilers on the lateral sides of the glass. This amounts to integrating in a single element the independent spoilers which were previously attached or adhered on the two sides of the tail gate panel, and the tail gate panel itself. One embodiment according to this invention consists in that said sections visible from the outside of the motor vehicle comprise reinforcement ribs.

The reinforcement ribs preferably have an L- or V-shaped cross-section.

One embodiment according to this invention consists in that said box comprises a composite material whose substrate is made from thermosetting plastic.

The technical term "composite material" refers to a material frequently used in the manufacture of motor vehicle components, generally consisting of a plastic substrate and a reinforcement element (for example, fibres or textile) impregnated in this substrate. The presence of the reinforcement element increases the mechanical strength of the composite material; this material is generally used to manufacture elements for which one area or all the areas must be reinforced, for example the elements of the various panels. Depending on the type of the plastic substrate, a distinction is made between composite materials with thermosetting plastic substrate and composite materials with thermoplastic plastic substrate. The technical term "thermosetting plastic" designates a plastic capable of hardening when it is subjected to heat or to other conditions and which exhibits the characteristic of being insoluble (and of not melting), such as phenolic plastics, epoxy plastics, etc. The first time it is subjected to heat, a thermosetting plastic may melt and flow; when it is heated to a certain temperature, a chemical reaction occurs, which is a cross-linking reaction, and the plastic is solidified and hardens; this transformation is irreversible and afterwards, when the plastic is heated again, it does not melt or flow. It is precisely this characteristic which is exploited for forming, taking advantage of the fact that the material melts and becomes fluid the first time it is exposed to heat, to form cavities under the action of pressure, in order to obtain hardened products which have specific shapes and dimensions.

One embodiment according to this invention consists in that said section visible from the outside of the vehicle is given surface treatment to withstand ultraviolet (UV) radiation, or can be painted or overmoulded with a decorative film. Thus, the outer surface of this component may be an integral part of the overall aesthetics of the motor vehicle, and exhibit exterior characteristics which correspond to the overall design of the motor vehicle.

One embodiment according to this invention consists in that said motor vehicle comprises a tail gate panel according to any one of the above embodiments.

DESCRIPTION OF ATTACHED DRAWINGS

Detailed descriptions of this invention are provided below, referring to the attached drawings. Technicians of this technical field will easily understand that these drawings are only explanatory and are in no way intended to limit the field of protection of this invention. In the various attached drawings, identical indications correspond to identical or similar elements. For explanatory purposes, these drawings are not entirely drawn to scale.

EMBODIMENTS

Figure 1:
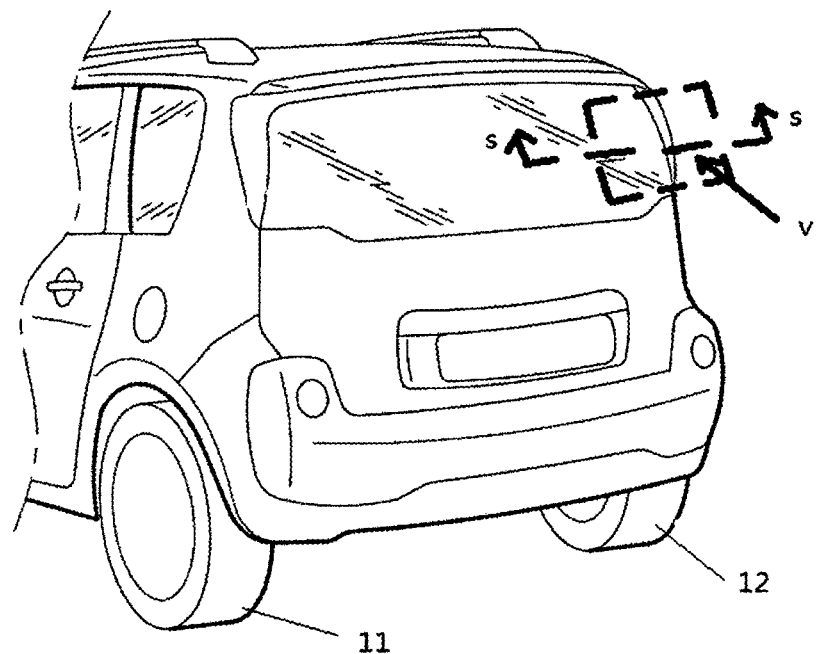
FIG. 1 is the rear view of a motor vehicle using an embodiment of this invention.
Figure 2:
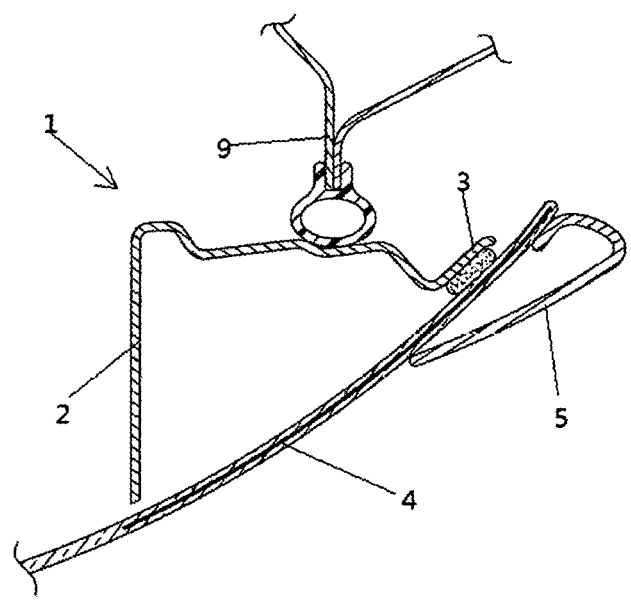
FIG. 2 is a horizontal exploded view in the S direction of FIG. 1 which illustrates the current state of the art.

FIG. 1 shows the rear section of a motor vehicle which comprises a tail gate, and which may be a tail gateback, a family car or an all-terrain vehicle. As shown on FIG. 1, the side with the rear wheel 11 is the left hand side of the motor vehicle, the side with the rear wheel 12 is the right hand side of the motor vehicle. If the tail gate panel 1 is split horizontally in the S direction, parallel to the length of the motor vehicle on FIG. 1, we obtain the exploded views of FIGS. 2 and 3. FIG. 2 shows a tail gate panel 1 comprising a spoiler 5 manufactured separately and adhered to the glass 4 in the current state of the art. FIG. 2 shows that one side of the box 2 is connected to the metal structure 9, the other side being connected (adhered) to the glass 4. The outer edge of the box 2 stops at the adhesion area 3 of the glass 4, it does not go past this area.

Figure 3:
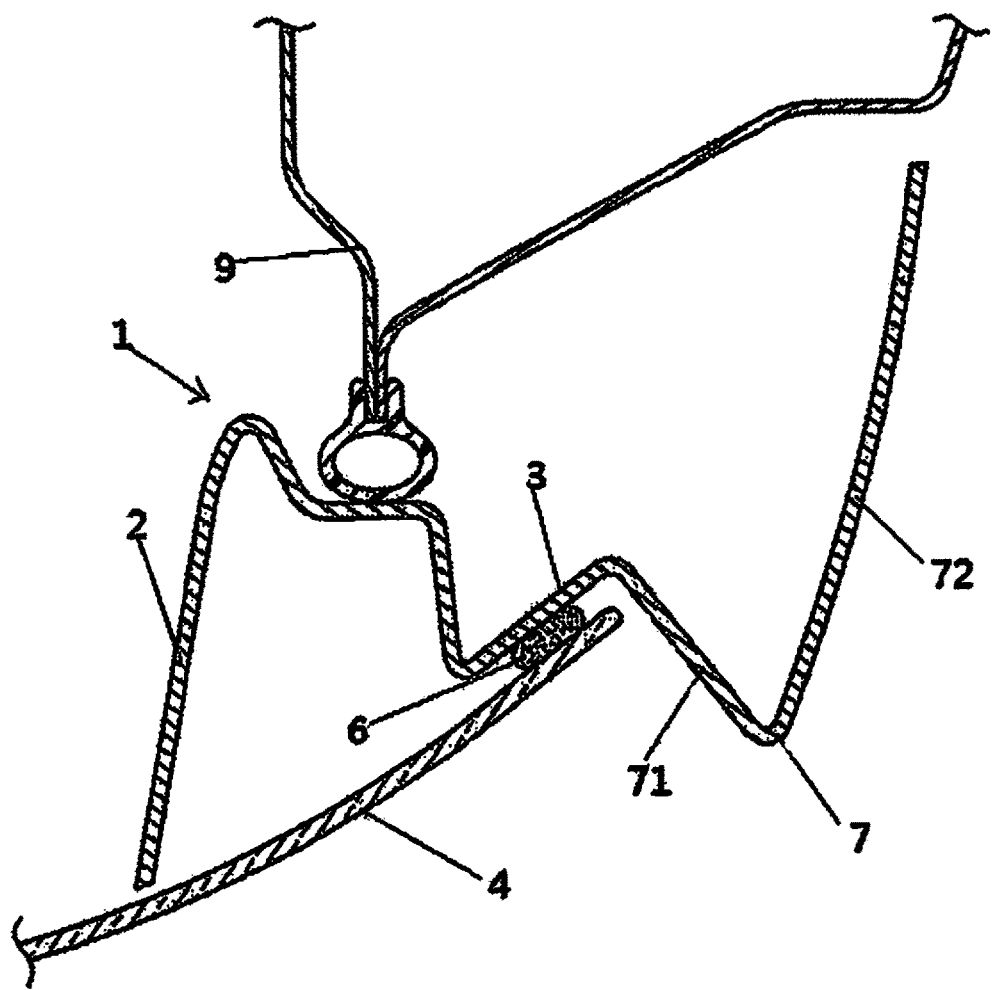
FIG. 3 is a horizontal exploded view in the S direction of FIG. 1 of a tail gate panel according to one embodiment of this invention.
Figure 5:
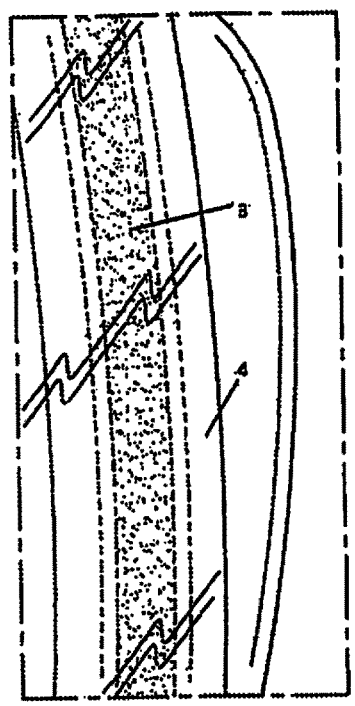
FIG. 5 is a partial enlarged view of the adhesion area in the V direction of FIG. 1.

FIG. 3 shows the portion located on the right of the motor vehicle of a tail gate panel 1 according to one embodiment corresponding to this invention. As shown on FIG. 3, one side (front of the motor vehicle) of the box 2 is connected to the metal structure 9, the other side (rear of the motor vehicle) is adhered to the glass 4 in the adhesion area 3 using an adhesive 6. FIG. 5 is a partial enlargement of the adhesion area 3. The outer edge of the box 2 (right hand side of the motor vehicle) extends beyond the adhesion area 3 and goes past the tail gate panel 1, forming a protruding section 7 visible from the outside of the vehicle; this protruding section 7 has a shape which gives good aerodynamics, and comprises a back side 71 and a lateral side 72.

Since the protruding section 7 gives good aerodynamics, it can play a role similar to that of the spoilers 5 of FIG. 2. Moreover, since the protruding section 7 is an extension of the box 2 and it is integrated to the box 2, there is no need to manufacture spoilers 5 separately and, in addition, there are no corresponding technical installation operations, which significantly improves productivity and reduces the production cost.

For an embodiment based on this invention, a composite material may be used, preferably selecting a thermosetting plastic, to manufacture the box 2 and the protruding section 7. Since the thermosetting composite material offers good plasticity performance offers both good plasticity performance and relatively good mechanical strength, it can be used to manufacture integrated aerodynamic components of complex shape capable of meeting the mechanical strength requirements, for example the protruding section 7 of FIG. 3. Moreover, since the entire panel is integrated, there is no need for the metal inserts or the connection parts between the various parts, which therefore minimises the specific weight and air resistance of the motor vehicle on this area.

For an embodiment based on this invention, the outer surfaces of the back side 71 and the lateral side 72 of the protruding section 7 form integral parts of the overall outer appearance of the motor vehicle, and exhibit surface characteristics which correspond to the overall design of the outside of the motor vehicle; it is therefore necessary to apply surface treatment to withstand ultraviolet radiation, apply paint, or cover with a decorative film.

We can understand that the above embodiment is only a diagrammatic representation of the right hand side of the tail gate panel 1, and that the left hand side is not shown. Technicians of this technical field will easily understand that the structure and shape of the left hand side and of the right hand side are identical and symmetrical.

Figure 4:
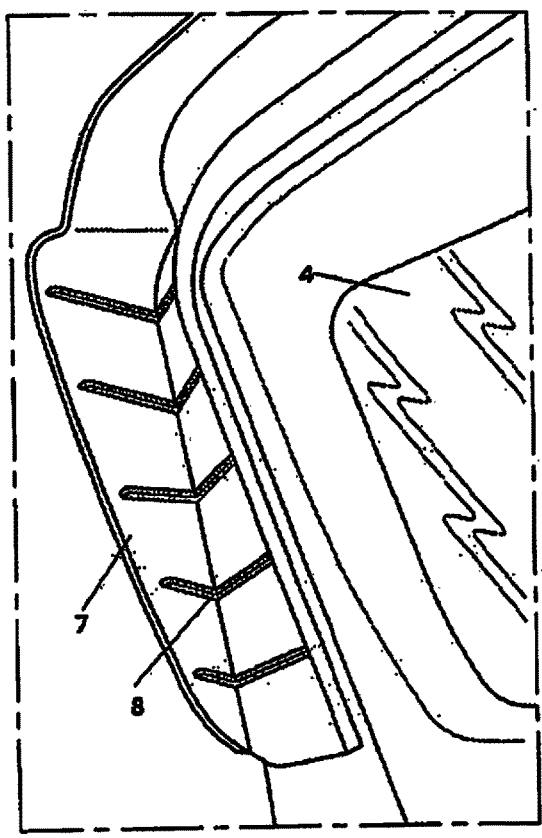
FIG. 4 is an enlarged perspective view of the right hand inner side of a tail gate panel according to one embodiment of this invention.

FIG. 4 shows the partial enlarged diagram of the area near the protruding section 7 of the tail gate panel 1 according to another embodiment of this invention. This figure shows the internal structure of the tail gate panel 1 on the right hand side of the motor vehicle. As shown on FIG. 4, the protruding section 7 further comprises reinforcement ribs 8. Consequently, the tail gate panel 1 has greater mechanical strength in this area. Preferably, the reinforcement ribs 8 have an L- or V-shaped cross-section.

Figures 6, 7:
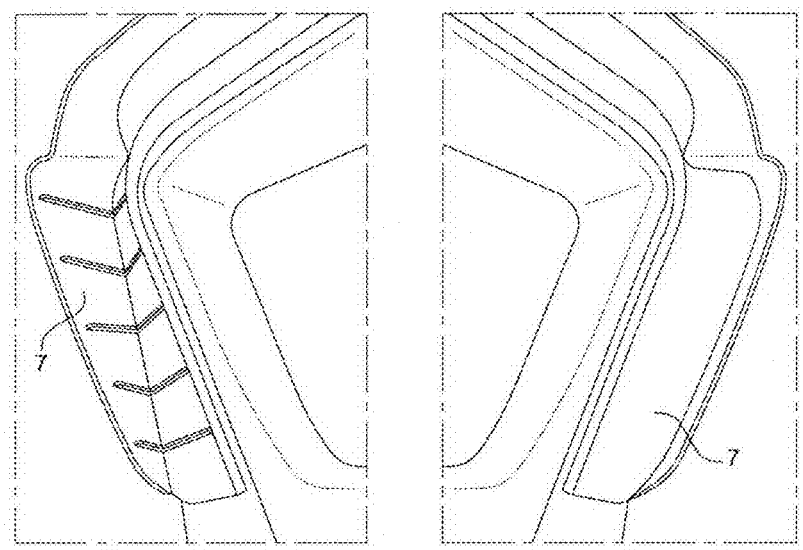
FIG. 6 is a three-dimensional view of the right hand inner side of a tail gate panel according to one embodiment of this invention.
FIG. 7 is a three-dimensional view of the left hand inner side of a tail gate panel according to another embodiment of this invention.

FIGS. 6 and 7 show respectively the enlarged diagrams of the protruding section 7 according to two different embodiments of this invention. The protruding section 7 of FIG. 6 is on the right hand side of the motor vehicle and has reinforcement ribs, while the protruding section 7 of FIG. 7 is on the left hand side of the motor vehicle and has no reinforcement ribs.

Figure 8:
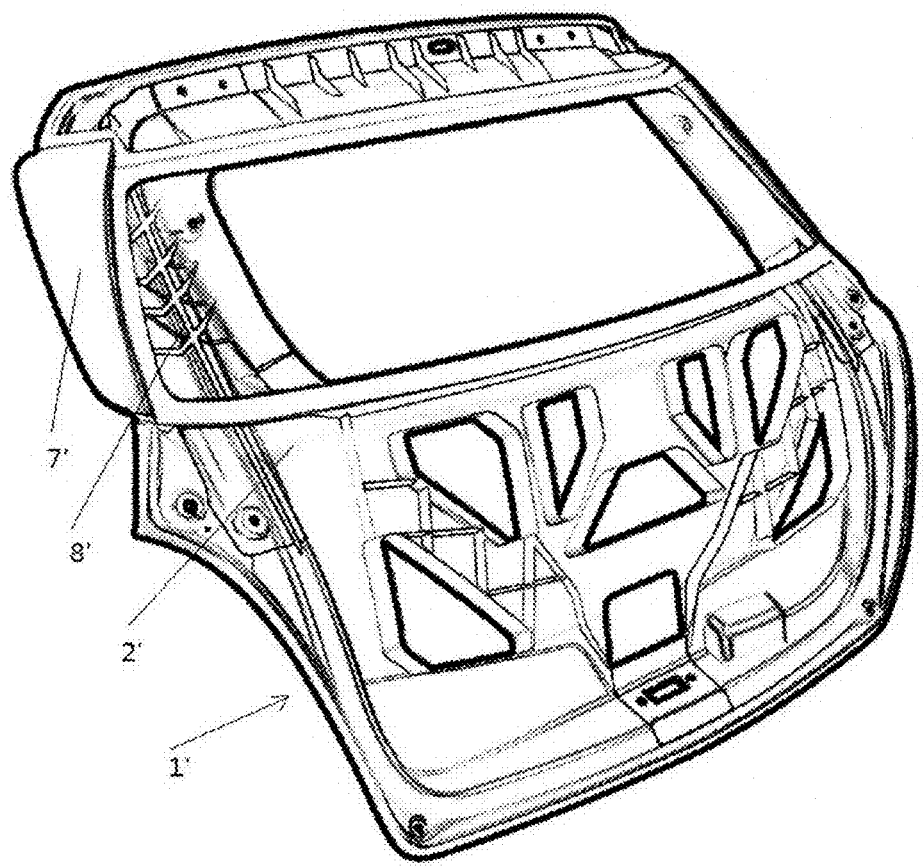
FIG. 8 is a perspective view of a tail gate panel according to another embodiment of this invention.

FIG. 8 shows a tail gate panel 1' according to another embodiment of this invention; the shape and structure of this tail gate panel 1' are different from those of the tail gate panel 1, but may also, on the basis of the above embodiment, comprise a protruding section 7' integrated via the extension of the inner box 2'. This protruding section 7' has reinforcement ribs 8' whose shape and structure are different from those of the previous embodiment.

The attached figures and the preceding explanations have described non-limiting embodiments of this invention. To explain the principles of the invention, some conventional elements have been simplified or omitted. Technicians of this technical field will be able to understand that the variants of these embodiments pertain to the field of this invention. Technicians of this technical field will also be able to understand that the characteristics described above may be associated in multiple ways to create numerous variants of this invention. Consequently, this invention is not limited in any way to the embodiments described above and is only limited by the claims and resulting similar objects.

The invention claimed is:

1. A motor vehicle tail gate panel comprising:
   a first side facing an inside of the motor vehicle;
   a second side facing an outside of the motor vehicle,
   a box including an adhesion area on an outer side thereof configured to adhere a glass,
   wherein the box extends beyond adhesion area so as to form at least one protruding section that is visible from the outside of the motor vehicle and a shape of the at least one protruding section improves aerodynamics of the motor vehicle.

2. The motor vehicle tail gate panel according to claim 1, further comprising: two sections visible from the outside of the motor vehicle and forming spoilers on lateral sides of the glass.

3. The motor vehicle tail gate panel according to claim 1, wherein the protruding section visible from the outside of the motor vehicle comprises reinforcement ribs.

4. The motor vehicle tail gate panel according to claim 3, wherein the reinforcement ribs have an L- or V-shaped cross-section.

5. The motor vehicle tail gate panel according to claim 1, wherein the box comprises a composite material with thermosetting matrix.

6. The motor vehicle tail gate panel according to claim 1, wherein the protruding section visible from the outside of the motor vehicle is surface treated to withstand ultraviolet (UV) radiation, or is painted or overmolded with a decorative film.

7. A motor vehicle comprising the motor vehicle tail gate panel according to claim 1.

* * * * *

UNITED STATES PATENT AND TRADEMARK OFFICE
CERTIFICATE OF CORRECTION

PATENT NO. : 10,399,614 B2  
APPLICATION NO. : 15/540374  
DATED : September 3, 2019  
INVENTOR(S) : Pascal Depardon et al.

Page 1 of 1

It is certified that error appears in the above-identified patent and that said Letters Patent is hereby corrected as shown below:

On the Title Page

(71) Applicant should read: Compagnie Plastic Omnium, Lyon (FR)

(73) Assignee should read: Compagnie Plastic Omnium, Lyon (FR)

Signed and Sealed this  
Third Day of November, 2020

Andrei Iancu  
*Director of the United States Patent and Trademark Office*